United States Patent Office 3,264,349
Patented August 2, 1966

3,264,349
N-MONOALKYL-ALPHA-(ALKOXY-PHENYL-AMINO)-ACYLAMIDES
Angelo Larizza and Giovanni Brancaccio, Naples, Italy, assignors to Farmochimica Cutolo-Calosi, a corporation of Italy
No Drawing. Filed Apr. 4, 1963, Ser. No. 270,519
Claims priority, application Italy, Apr. 10, 1962, 7,087
3 Claims. (Cl. 260—559)

Our invention relates to novel chemical compounds which may be regarded as mono substituted acylamides. More particularly, our invention relates to N-monoalkyl-alpha (alkoxy-phenyl-amino)-acylamides.

The new compounds (I) are useful as intermediates in the preparation of other organic compounds. The new compounds possess pharmacological activity including analgesic, antipyretic, anti-inflammatory, anesthetic and central nervous system depressant activity such as sedative activity.

The new compounds are generally useful in the treatment of ailments such as acute and chronic inflammatory arthropathy (mono- and poly-articular); degenerative arthropathy; muscular pains, neuralgia and neuritis; tenonitis and peritendinitis; capsulitis; bursitis; periarthritis; myositis and cephalea of any origin and nature.

The new compounds can be administered either orally or rectally in dosages ranging from about 250 mg. as a minimum up to a maximum for adults of about 500 to about 1000 mg. per dose administered as frequently as every 4 to 6 hours, if necessitated by the ailment and its severity.

The new compounds can be represented by the formula:

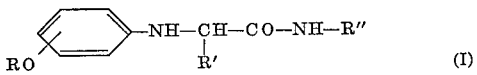
(I)

where R and R″ are alkyl radicals, preferably lower alkyl of 1 to 4 carbon atoms; and R′ is either hydrogen, or an alkyl radical, preferably lower alkyl of 1 to 4 carbon atoms, or an aryl radical, preferably phenyl, lower alkyl phenyl or halophenyl. The compounds for Formula I wherein R′ is an alkyl radical, preferably lower alkyl of 1 to 4 carbon atoms, or an aryl radical, preferably phenyl, lower alkyl phenyl or halophenyl, are preferred since they possess increased pharmacological activity over the compounds wherein R′ is hydrogen. The new compounds can be prepared and used in the form of the free base or in the form of their salts, e.g. as the hydrochloride, sulfate or tartrate.

The new compounds (I) can be prepared by two different methods. The first method (Method A) includes reacting the appropriate alpha-halogenated acylamide, corresponding to the formula:

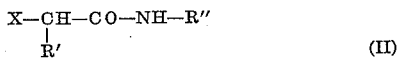
(II)

(where X is chlorine or bromine and R′ and R″ are as defined above) with an aromatic amine having the formula:

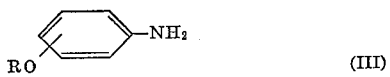
(III)

where R represents an alkyl group. Preferably the R′ substituent of the acylamide (II) is either hydrogen or a methyl, ethyl or phenyl radical.

The acylamides (II) and alkoxy anilines or aromatic amines (III) employed in the preparation of our new compounds can be obtained in accordance with any of the methods well known in the art. We have found, however, that particularly favorable results are obtained in the preparation of chloracetylamides by adding chloracetyl chloride to an 8% solution of sodium hydroxide and primary amine, cooled to −10° C. The molar ratio of 1:1:1 of chloride, amine and alkali is preferred for the reaction. The chloracetylamides thus produced can be extracted with a suitable solvent and then distilled. For the preparation of alpha-bromo-acylamides, the appropriate alpha-bromo-acid chloride is reacted with an amine, $NH_2$–R″, in the presence of benzene, dichloromethane or ether, the molar ratio 1:2 of chloride to amine being used.

The reaction of the appropriate alpha-halogen-acylamide (II) with alkoxy-aniline (III) to obtain the required mono-substituted acylamide (I), can be carried out with or without solvent. When a solvent is used, the molar ratio 1:2, amide to amine, must be used. When a solvent is not used, the molar ratio 1:1 may be used instead, and the hydrogen halide developed is taken up by an acceptor of acid or by a mildly basic material, such as carbonate of alkaline or alkaline-earth metals, sodium bicarbonate or sodium alcoholate; approximately 2–2.5 equivalents of this material are preferably used. Suitable solvents include alcoholic compounds or hydrocarbon solvents such as toluene. The reaction time when employing a solvent, is about 12 hours at a temperature of about 100° C.; when not employing a solvent the reaction is complete after 20–24 hours of refluxing.

The second method (Method B) for preparing our new compounds (I) includes the aminolysis of a lower alkyl, preferably ethyl or methyl, ester of the appropriate alpha-(alkoxy-phenyl-amine)-organic acid (preferably acetic acid or acetic acid substituted in the alpha position by an alkyl or aryl residue), having the general formula:

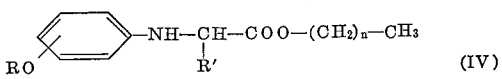
(IV)

with a primary amine, such as a primary alkyl amine. The ester of the appropriate alpha-alkoxy-phenyl-amino-organic acid (IV) and the appropriate primary amine, in a molar ratio of 1:1.5, are heated for about 20 hours at 100° C. in a closed container. Generally, the presence of a solvent with alcoholic functions is preferred. After cooling, excess amine and solvent, if any, are removed at reduced pressure. The residue thus obtained is distilled and crystallized.

Our invention will be further illustrated by the following examples:

EXAMPLE I

*N-n-propyl-α-(p-ethoxy-phenyl-amino)-acetamide*

METHOD A

A quantity of 160 g. of anhydrous potassium carbonate powder was added to a solution of 137 g. p-phenetidine and 140 g. of N-n-propyl-chloracetamide in 120 ml. of ethanol. The mixture was refluxed for 24 hours with agitation. Then the mixture was cooled, filtered, and allowed to dry. The residue was washed with cold ether first, and then with water. A yield of 80% of N-n-propyl-α-(p-ethoxy-phenyl-amino)-acetamide was obtained. The product thus obtained is sufficiently pure. It can be further purified by crystallization from alcohol-water (M.P. 87° C.) or by distillation (B.P. 185–90° C. at 0.001 mm. Hg).

Analysis ($C_{13}H_{20}N_2O_2$): Theoretical—C, 66.07%; H, 8.53%; N, 11.86%. Found—C, 66.10%; H, 8.58%; N, 11.89%.

METHOD B

In a closed tube 44 g. of the ethyl ester of (p-ethoxy-phenyl-amino)-acetic acid and 18 g. of propylamine dissolved in 150 ml. of methanol were heated at 100° C.

for 20 hours. The solution was cooled and evaporated at low pressure. The residue was crystallized from ethanol-water. A yield of 43 g. of N-n-propyl-α-(p-ethoxy-phenyl-amino)-acetamide was obtained. No depression of the melting point was observed by mixing with a sample obtained by Method A.

The compound of this example exhibits analgesic, antipyretic, anti-inflammatory, anesthetic and sedative activity.

EXAMPLE II

N-n-propyl-α-(p-ethoxy-phenyl-amino)-propionamide

A mixture of 140 g. p-phenetidine and 100 g. α-bromo-N-propyl-propionamide was heated at 100° C. for 12 hours. After the reaction was completed, the mixture was treated with benzene and then filtered. After washing with water the filtrate was distilled; the product, N-n-propyl-α-(p-ethoxy-phenyl-amino)-propionamide distilled at 149° C. at 0.001 mm. Hg. The yield was 90%. The substance crystallized from benzene-petroleum ether (fraction 60–68°); M.P. 93–94° C.

Analysis ($C_{14}H_{22}N_2O_2$): Theoretical—C, 67.17%; H, 8.86%; N, 11.19%. Found—C, 67.21%, H, 8.93%; N, 11.09%.

METHOD B

In a closed tube 47 g. of α-(p-ethoxy-phenyl-amino)-propionic acid and 18 g. of propylamine dissolved in 150 ml. of methanol were heated at 100° C. for 20 hours. The cooled solution was evaporated at low pressure and the residue crystallized from ethanol-water. A yield of 41.59 of N-n-propyl-α-(p-ethoxy-phenyl-amino)-propionamide was obtained. No depression of the melting point was observed by mixing with a sample obtained by Method A.

The compound of this example exhibits analgesic, antipyretic, anti-inflammatory, anesthetic and sedative activity of a significantly enhanced nature over the compound of Example I.

EXAMPLE III

N-n-propyl-α-(p-ethoxy-phenyl-amino)-butyramide

METHOD A

A mixture of 56 g. p-phenetidine and 42 g. of α-bromo-propyl-butyramide were heated to 100° C. for 12 hours. The mixture was allowed to cool, added with 500 ml. benzene then filtered and the benzene solution washed with water. After removal of the solvent, the residue obtained was distilled at low pressure. The product, N-n-propyl-α-(p-ethoxy-phenyl-amino)-butyramide, distilled at 160–2° C. at 0.001 mm. Hg; $n_D^{18}=1.5337$; yield 86%.

Analysis ($C_{15}H_{24}N_2O_2$): Theoretical—C, 68.15%; H, 9.15%; N, 10.60%. Found—C, 68.09%; H, 9.27%; N, 10.64%.

METHOD B

In a closed tube 50 g. of the ethyl ester of α-(p-ethoxy-phenyl-amino)-butyric acid and 18 g. of propylamine dissolved in 150 ml. of methanol were heated at 100° C. for 20 hours. The cooled solution was evaporated at low pressure and the residue crystallized from ethanol-water. A yield of 42 g. of N-n-propyl-α-(p-ethoxy-phenyl-amino)-butyramide was obtained. No depression of the melting point was observed by mixing with a sample obtained by Method A.

EXAMPLE IV

N-n-propyl-α-(m-ethoxy-phenyl-amino)-acetamide

A solution of 28 g. m-phenetidine and 27 g. N-n-propyl-chloroacetamide in 600 ml. of absolute ethanol in the presence of 35 g. of potassium carbonate was heated at reflux temperature for 24 hours. After cooling, the product was filtered and the solvent allowed to evaporate. The residue was distilled; B.P. 170–5° C. at 0.005 mm. Hg. A yield of 78% of N-n-propyl-α-(m-ethoxy-phenyl-amino)-acetamide was obtained.

Analysis ($C_{13}H_{20}N_2O_2$): Theoretical—C, 66.07%; H, 8.53%; N, 11.86%. Found—C, 66.12%; H, 8.63%; N, 12.03%.

EXAMPLE V

N-n-propyl-α(o-ethoxy-phenyl-amino)-acetamide

A solution of 54 g. o-phenetidine and 28 g. N-n-propyl-chloracetamide was heated at 100° C. for 12 hours. The reaction mixture was allowed to cool and then treated with chloroform. The undissolved amine hydrochloride was separated by filtration and the residue distilled. The reaction product, N-n-propyl-α(o-ethoxy-phenyl-amino) acetamide boiled at 158° C. at 0.005 mm. Hg. The yield was 78%. The substance, after crystallization from a solution of benzene and petroleum ether (fraction 60–68°), melted at 91–2° C.

Analysis ($C_{13}H_{20}N_2O_2$): Theoretical—C, 66.07%; H, 8.53%; N, 11.86%. Found—C, 66.20%; H, 8.63%; N, 11.71%.

EXAMPLE VI

N-isopropyl-α(p-ethoxy-phenyl-amino)-acetamide

A solution of 70 g. p-phenetidine and 68 g. of N-isopropyl-chloracetamide in 1000 ml. absolute alcohol was heated in the presence of potassium carbonate for 24 hours. The reaction mixture was allowed to cool and then filtered. After evaporation of the solvent, the residue was distilled; B.P. 158° C. at 0.001 mm. Hg. The substance turned solid and was crystallized from benzene-petroleum ether (fraction 60–68°); M.P. 60–1° C. A yield of 75% of N-isopropyl-α-(p-ethoxy-phenyl-amino)-acetamide was obtained.

Analysis ($C_{13}H_{20}N_2O_2$): Theoretical—C, 66.07%; H, 8.53%; N, 11.86%. Found—C, 66.01%; H, 8.48%; N, 11.70%.

METHOD B

In a closed tube 44 g. of the ethyl ester of p-ethoxy-phenyl-amino-acetic acid and 18 g. of isopropyl amine dissolved in 150 ml. of methanol were heated at 100° C. for 20 hours. The cooled solution was evaporated at low pressure and the residue re-crystallized from ethanol-water. A yield of 42 g. of N-isopropyl-α-(p-ethoxy-phenyl-amino)-acetamide was obtained. No depression of the melting point was observed by mixing with a sample obtained by Method A.

EXAMPLE VII

N-n-propyl-α-(p-ethoxy-phenyl-amino)-α-phenyl-acetamide

A solution of 13.7 g. of p-phenetidine and 26 g. α-bromo-N-n-propyl-phenyl-acetamide in the presence of 20 g. potassium carbonate was heated at reflux temperature for 24 hours. After filtering, the solvent was removed at low pressure. The residue thus obtained was extracted by heating with ethyl-acetate. Cooling of the solvent produced crystallization of N-n-propyl-α-(p-ethoxy-phenyl-amino)-α-phenyl-acetamide in a yield of 50–55%.

Analysis ($C_{19}H_{24}N_2O_2$): Theoretical—C, 73.04%, H, 7.74%; N, 8.96%. Found—C, 73.10%; H, 7.76%; N, 8.82%.

EXAMPLE VIII

N-n-propyl-α-(p-methoxy-phenyl-amino)-acetamide

A solution of 12.5 g. p-anisidine (p-methoxy-phenyl-amine) and 13.5 g. chlor-N-n-propyl-acetamide, in 200 ml. absolute ethanol was heated at reflux temperature for 24 hours. After cooling the solvent was allowed to evaporate and the residue was filtered and then distilled. The reaction product, p-anisidyl-N-n-propyl-acetamide [N-n-propyl-(p-methoxy-phenyl-amino) acetamide], boiled at 174–5° C. at 0.002 mm. Hg. The yield was 75%. The substance turned solid and crystallized from petroleum-ether (fraction 60–68°); M.P. 54–5° C.

Analysis ($C_{12}H_{18}N_2O_2$): Theoretical—C, 64.84%; H, 8.16%; N, 12.60%. Found—C, 64.89%; H, 8.28%; N, 12.49%.

EXAMPLE IX

*N-n-propyl-α-(p-propoxy-phenyl-amino)-propionamide*

A mixture of 60 g. p-propoxy-aniline [p-propoxy-phenyl-amine] and 40 g. α-bromo-N-n-propyl-propionamide was heated at 100° C. for 12 hours. The reaction mixture was allowed to cool, benzene was added and then the mixture was filtered. After washing with water and drying over anhydrous sodium sulfate, the mixture was evaporated at low pressure. The residue, crystallized from petroleum ether, yielded 45 g. N-n-propyl-α-(p-propoxy-phenyl-amino)-propionamide; M.P. 68–69° C.

Analysis ($C_{15}H_{24}N_2O_2$): Theoretical—C, 68.15%; H, 9.15%; N, 10.60%. Found—C, 68.29%; H, 9.11%; N, 10.54%.

METHOD B

In a closed tube 50 g. of the ethyl ester of α-p-propoxy-phenyl-amino-propionic acid and 18 g. of propylamine dissolved in 150 ml. methanol were heated at 100° C. for 20 hours. The solution was allowed to cool and then evaporate at low pressure. The residue crystallized from petroleum ether. A yield of 46 g. of N-n-propyl-α-(p-propoxy-phenyl-amino)-propionamide was obtained. No depression of the melting point was observed by mixing with a sample obtained by Method A.

From the examples, it is evident that other compounds of the invention can be prepared in a similar manner by substituting other alkyl radicals for the ethyl of the alkyloxy group, or by variation of the substituents R' and R", e.g. by using α-halogen-N-methyl-, ethyl-, butyl-, secondary-butyl-, i-butyl-, tertiary-butyl-acylamides.

The products covered by this invention are solids or oily, high boiling liquids, with a weak basic character.

The new compounds and their pharmaceutically acceptable salts, which are of limited solubility in diluted acids, can be satisfactorily dissolved by using surface active agents in order to obtain a more complete physiologic effect. Examples of lipophilic solvents, considered useful to obtain a better physiological effect, are vegetable and animal oils, fat bases such as Vaseline or cholesterol, and oxyalkyl derivatives.

The compounds of our invention can be used in conventional dosage forms e.g. tablets, coated tablets, capsules, suppositories, by their incorporation with conventional pharmaceutical carriers, e.g. sugar, corn starch, gelatin, water, and preparation of the dosage form by conventional means.

The following examples illustrate suitable pharmaceutical compositions including a pharmaceutical carrier and the new compounds. In these examples the quantities are given for single units, it being understood that, in actual practice, the dosage forms will be prepared in suitable quantities, and the amounts adjusted accordingly.

EXAMPLE X

*Tablets, 500 mg.*

500 mg. of the N-n-propyl-α-(p-ethoxy-phenyl-amino)-propionamide of Example II and 100 mg. of corn starch were mixed and granulated with water. The granulation was dried and ground to fine granules for tableting. 14 mg. of magnesium stearate was added as a lubricant together with sufficient corn starch to give a weight of 700 mg. per tablet. The product was compressed on a single punch or rotary machine using a 13 mm. punch.

EXAMPLE XI

*Sugar coated tablets, 250 mg.*

(a) PREPARATION OF NUCLEI 250 mg. of the N-n-propyl-α-(p-ethoxy-phenyl-amino)-propionamide of Example II and 50 mg. of corn starch were mixed and granulated with water. The granulation was dried and ground to fine granules for tableting. 7 mg. of magnesium stearate was added as a lubricant together with sufficient corn starch to give a weight of 350 mg. per nucleus.

(b) WATERPROOFING 10,000 of the above obtained nuclei were waterproofed with a protecting film obtained by rotating them with 50 g. of sandarac gum, 30 g. of colophony dissolved in 70 ml. of ethanol 95% and drying.

(c) SUGAR COATING

The waterproofed nuclei were heated and rotated in a 65–70% sugar syrup and added, as usual, from time to time with small portions of talc and starch. The operation was continued until the sugar coated tablets weighed 650 mg. each.

(d) POLISHING

The sugar coated tablets were rotated in 30 ml. of a solution of a mastic gum, colophony in ethanol and ethyl ether. After the solution had been dried on the tablets, they were polished by rotating in a paste of spermaceti, white beeswax and oil of turpentine.

EXAMPLE XII

*Capsules, 200 mg.*

200 mg. of the N-n-propyl-α-(p-ethoxy-phenyl-amino)-propionamide and 10 mg. of magnesium stearate were well mixed and filled in gelatin capsules containing each 210 mg. of this mixture. The capsules were sealed and kept in well closed containers.

EXAMPLE XIII

*Suppositories, 500 mg.*

500 mg. of the N-n-propyl-α-(p-ethoxy-phenyl-amino)-propionamide were reduced to a fine powder and mixed at 40–50° C. with 1.5 g. molten hydrogenated fatty acid glycerides. The warm homogenous mixture was poured into the appropriate mold, cooled and packed.

The other compounds of the Examples I and III to IX can also be used to prepare pharmaceutical preparations such as those of Examples X to XIII.

We claim:
1. An N-monoalkyl-α-(alkoxy-phenyl-amino)-acylamide of the formula

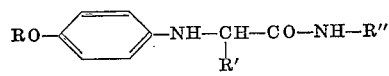

wherein each of R, R' and R" is lower alkyl of from 1 to 4 carbon atoms.

2. N - n - propyl - α - (p - ethoxy - phenyl - amino) - propionamide.

3. N - n - propyl - α - (p - ethoxy - phenyl - amino) - α-phenyl-acetamide.

References Cited by the Examiner

UNITED STATES PATENTS 1,672,689  6/1928  Rosin _____ 260—559
2,568,142  9/1951  Bruce et al. _____ 260—559

FOREIGN PATENTS

36/1480    3/1961  Japan.
36/13,213  8/1961  Japan.

OTHER REFERENCES

Fujimura et al.: Jour. Pharm. Soc. of Japan, vol. 81, pages 659–63 (1961).

Takahashi et al.: Chemical Abstracts, vol. 56, page 7422 (1962), abstract of Japanese Patent No. 13,213 (1961).

WALTER A. MODANCE, *Primary Examiner.*

NICHOLAS RIZZO, *Examiner.*

NATALIE TROUSOF, *Assistant Examiner.*